(12) United States Patent
Schmidt

(10) Patent No.: US 11,781,696 B2
(45) Date of Patent: Oct. 10, 2023

(54) HYGIENIC TUBE ADAPTER

(71) Applicant: Endress+Hauser SE+Co. KG, Maulburg (DE)

(72) Inventor: Robert Schmidt, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 268 days.

(21) Appl. No.: 17/601,478

(22) PCT Filed: Mar. 27, 2020

(86) PCT No.: PCT/EP2020/058770
§ 371 (c)(1),
(2) Date: Oct. 5, 2021

(87) PCT Pub. No.: WO2020/207827
PCT Pub. Date: Oct. 15, 2020

(65) Prior Publication Data
US 2022/0205572 A1    Jun. 30, 2022

(30) Foreign Application Priority Data
Apr. 12, 2019    (DE) .................... 10 2019 109 787.8

(51) Int. Cl.
*G01D 11/30*    (2006.01)
*F16L 41/10*    (2006.01)

(52) U.S. Cl.
CPC .............. *F16L 41/10* (2013.01); *G01D 11/30* (2013.01)

(58) Field of Classification Search
CPC .................................. F16L 41/10; G01D 11/30
See application file for complete search history.

(56) References Cited

U.S. PATENT DOCUMENTS

| 4,823,612 A | 4/1989 | Ichino |
| 2003/0056581 A1 | 3/2003 | Turner et al. |
| 2009/0188328 A1* | 7/2009 | Iijima ............... G01F 1/584 73/861.12 |
| 2020/0124220 A1* | 4/2020 | Schmidt ............... G01F 1/662 |

FOREIGN PATENT DOCUMENTS

| DE | 102011004807 A1 | 8/2012 |
| DE | 102013100158 A1 | 7/2014 |
| DE | 102013102055 A1 | 9/2014 |
| DE | 102013104781 A1 | 11/2014 |
| DE | 102016115426 A1 | 2/2018 |

(Continued)

*Primary Examiner* — Jamel E Williams
(74) *Attorney, Agent, or Firm* — Mark A. Logan; Endress+Hauser (USA) Holding, Inc.

(57) ABSTRACT

A tube adapter for a pipeline for conveying a medium includes a pipeline section having a tubular, first channel for inserting the pipeline section into the pipeline, and a tubular, second channel, which is arranged at a first predeterminable angle to the first channel and connected with the first channel. In a transition region between a wall of the first and a wall of the second channel, at least one hollow is present in a wall of the first and/or second channel. The present disclosure further includes an arrangement having a measuring device and a tube adapter according to the present disclosure as well as to a method for producing a tube adapter according to the present disclosure.

15 Claims, 7 Drawing Sheets

(56) References Cited

FOREIGN PATENT DOCUMENTS

| | | | |
|---|---|---|---|
| DE | 102016121643 A1 | 5/2018 | |
| DE | 101017115139 A1 | 1/2019 | |
| DE | 102017115139 A1 * | 1/2019 | ............ F16L 41/008 |
| DE | 102017115139 A1 | 1/2019 | |
| DE | 102019109787 A1 * | 10/2020 | ............. F16L 41/10 |
| JP | H0712605 A | 1/1995 | |
| WO | 9613701 A2 | 5/1996 | |
| WO | 2009119132 A1 | 10/2009 | |
| WO | WO-2009119132 A1 * | 10/2009 | ............. G01F 1/584 |

\* cited by examiner

HYGIENIC TUBE ADAPTER

CROSS-REFERENCE TO RELATED APPLICATIONS

The present application is related to and claims the priority benefit of German Patent Application No. 10 2019 109 787.8, filed on Apr. 12, 2019, and International Patent Application No. PCT/EP2020/058770, filed on Mar. 27, 2020, the entire contents of which are incorporated herein by reference.

TECHNICAL FIELD

The invention relates to a tube adapter for conveying a medium, an arrangement for determining and/or monitoring at least one process variable with a sensor and a tube adapter of the invention, as well as to a method for producing a tube adapter of the invention. The sensor, in such case, is especially introducible into the tube adapter, which, in turn, can be integrated, for example, into an existing pipeline system.

BACKGROUND

Measuring arrangements having a sensor and a tube adapter are applied in automation technology in connection with a great number of measuring devices and/or field devices produced and sold by the applicant in great variety for determining various process variables. Examples of the process variables include flow or fill level of a flowing fluid, and pressure, density, viscosity, conductivity, temperature or pH value of a fluid. However, also optical sensors, such as turbidity or absorption sensors are known and fall within the scope of the invention.

The sensors are in many cases integrated by shape and/or force interlocking, e.g., frictional interlocking, into the tube adapter by means of suitable sealing mechanisms and even directly welded and/or bonded therewith. Further known to those skilled in the art are numerous means, by which a tube adapter can be integrated into an existing pipeline system.

The introduction of a sensor into a tube adapter can be accompanied by disadvantageous gaps, joints and/or dead spaces. For a large number of applications, such as in the case of sterile processes, in which a product is made from a raw or starting material by the application of chemical, physical or biological procedures, for example, in the pharmacy and/or foods industries, such gaps, joints and/or dead spaces between the individual components are not, or only to a very limited extent, acceptable. Such connection regions form potential receptacles for health endangering germs. In order, for example, to avoid deposits, or the forming of a biofilm, within a pipeline, an as residue free as possible cleaning should be assured.

In this connection, different international and national regulatory authorities have developed standards, among others for the production and embodiment of equipment permitted for sterile processes, in which a product is made from a raw or starting material by the application of chemical, physical or biological procedures. By way of example, reference is made, in this connection, to the standards of the "American Society of Mechanical Engineers" (ASME), especially the so-called "ASME Bioprocessing Equipment—Standard" (BPE), the "3-A Sanitary Standards Inc." (3-A), and the "European Hygienic Design Group" (EHEDG). The standards of ASME, BPE and 3A are especially relevant for American matters, while the standard of EHEDG comes into consideration predominantly in Europe. Typical requirements formulated in these standards for a component concern especially geometry and/or surface character, which should be formed in such a manner that no deposits can form and the component is easy to clean and/or sterilize. For example, no narrow gaps should be present.

Concerning measuring devices conforming to such standards, for example, reference is made to DE102013100158A1, which describes a one piece device having a sensor and a pipeline section with T-shape. The sensor is so arranged in a part of the adapter that the end surface of the sensor facing the medium lies flush with the inner wall of the first part of the adapter. The end surface of the sensor is, thus, virtually an integral part of the inner wall of the first part of the adapter.

Known from DE102016121643A1 is, furthermore, a measuring arrangement having a sensor, which is releasably introducible into an opening of a pipeline section. For preventing gaps in the connection regions, at least one component of the sensor is so embodied that in the installed state it terminates flush with an inner wall of the pipeline section. The at least one component of the sensor is, thus, matched to a geometry of the pipeline section.

DE102017115139A1, in turn, describes a measuring tube, which is embodied in such a manner that in a transition region between a pipeline section and a tubular body connected therewith, all points of at least a first part of the wall, especially inner wall, of the pipeline section defining the opening are located in a plane. In this way, a gap and dead space free transition between the particular sensor and the measuring tube is achieved.

SUMMARY

The object is achieved by the tube adapter, by the arrangement and by the method according to the present disclosure.

Starting from the above-described state of the art, an object of the present invention is to provide a measuring point, which meets usual hygiene requirements in especially easy manner.

The object is achieved by the tube adapter as claimed in claim 1, by the arrangement as claimed in claim 10 and by the method as claimed in claim 11.

As regards the tube adapter, the object is achieved by a tube adapter for a pipeline for conveying a medium, comprising a pipeline section having a tubular, first channel for inserting the pipeline section into the pipeline, and a tubular, second channel, which is arranged at a first predeterminable angle, especially perpendicularly, to the first channel and connected with the first channel. According to the invention, in a transition region between a wall of the first and a wall of the second channel, at least one hollow is present in a wall of the first and/or second channel. In the case in which a longitudinal axis of the second channel is arranged perpendicularly to a longitudinal axis of the first channel, the tube adapter is a T-piece.

The hollow serves to prevent dead spaces and/or gaps in the transition region, especially when a device for determining and/or monitoring a process variable is introduced into the tube adapter. A hollow in the sense of invention is a predeterminable volume of the pipeline section in the transition region, which is missing from the walls of the first and/or second channel. The exact geometry of the hollow depends, among other things, on the geometry of the pipeline section as well as the method used for producing the tube adapter.

The walls of the two tubular channels are usually curved, for example, they have circular, cross-sectional areas. Correspondingly, the opening, by which the two channels are connected together, is likewise curved. Such can disadvantageously lead to the forming of deposits in the transition region between the tube adapter and a device provided in the tube adapter. Because of the at least one hollow in the transition region between the two channels, such disadvantageous effects can be significantly reduced. Thus, the features of a tube adapter of the invention assures a gap and/or dead space free transition between the wall, especially the inner surface, of the first channel and a component of a measuring device introducible into the second channel.

Advantageously, no additional modification of the sensor is needed for meeting the established hygiene requirements. The component, or an end surface of the component, of the sensor, can be so arranged that such terminates essentially flush with the wall of the first channel in the region of the opening to the second channel. Thus, without special demands on the sensor, established hygiene regulations can be met. For example, a gap free transition between the component and the wall of the first channel can be assured.

The tube adapter includes two openings in the region of the first channel, for example, for inserting the tube adapter into an existing pipeline system. These two openings are arranged in the case of a straight pipeline section usually along a shared longitudinal axis of the pipeline section. The invention, is, however, not limited to such pipeline sections. Rather, the pipeline section can also have at least one bent segment.

Any securement option generally known to those skilled in the art, such as, for example, flange, weld or clamping connections, can be used for securing the pipeline section into an existing pipeline system. The lengths of the channels and the dimensioning of the pipeline section can be selected to fit a desired application. Thus, for some applications, for example, it can be advantageous to minimize the length of the first channel.

It is to be noted, furthermore, that the tube adapter of the invention can be produced both as one piece as well as also of a number of components joined together. Such can vary depending on the method of production. For example, the tube adapter, or at least individual components of the tube adapter, can be produced using a lathe or automatic screw machine and/or by milling. Individual components can, for example, also be welded to one another. However, also other suitable production methods sufficiently known to those skilled in the art, for example, generative, or additive, production methods can be suitable for manufacturing a tube adapter of the invention. In the case of a generative, or additive, production method, such as, for example, a 3D printing method, the components are produced in a primary shaping process. Such generative production methods, which, in principle, represent an industrial and mass production capable further development of so-called rapid prototyping, are being increasingly accepted for industrial production. The established, various methods of production are well known to those skilled in the art and are, therefore, not explained in detail here.

In an embodiment, in an end region of the second channel, especially in the region of an opening of the second channel, a screw thread can be provided in a wall of the second channel. By means of the screw thread, a measuring device or a component of a measuring device can be releasably secured in the tube adapter.

In an additional embodiment, a volume and/or a geometry of the at least one hollow is selected as a function of a diameter of the first and/or second channel. Preferably, the volume of the hollow is additionally adjusted by taking into consideration a diameter of a device provided in the second channel for determining and/or monitoring a process variable. Especially, the volume of the hollow is selected in such a manner that the component introduced in the second channel terminates essentially flush with a wall of the first channel in the transition region.

In order to avoid dead spaces and/or gaps in the transition region independently of the diameters of the first and second channels, the volumes and, in given cases, the geometry of the hollow must be suitably adjusted. The character of the transition regions depends on the diameters of the two channels. Thus, in the case of different diameters of the two channels, other geometric features of the transition regions are taken into consideration than in the case of equal diameters of the two channels.

A preferred embodiment provides that the tube adapter includes a third, tubular channel, which is arranged at a second predeterminable angle to the first channel and is connected with the first channel. Preferably, the longitudinal axes of the second and third channels extend in parallel with one another, especially align with one another, so that the second and third channels lie opposite one another across the first channel. In such case, for example, two measuring devices or two components of one or two measuring devices can be introduced into the tube adapter.

A preferred embodiment of the tube adapter includes that at least two hollows are introduced into the transition region between the walls of the first and second channels. The two hollows are, especially, equally embodied relative to their geometry and symmetrically arranged relative to one another.

Advantageously, the two hollows are arranged lying opposite one another across a cross-sectional area of the second channel. It is likewise advantageous that the two hollows are arranged opposite one another across a longitudinal axis of the first channel. In these regions, the forming of deposits or arising of dead spaces is otherwise especially probable.

Finally, advantageously, a volume of the first hollow and a volume of the second hollow are differently sized, especially wherein a first increase of a diameter of the first channel due to the first hollow and a second increase of a diameter of the first channel due to the second hollow, especially in the transition region, are differently sized. In this way, for example, the forming of a trap in the transition regions of the two channels can be prevented. This concerns especially the case, in which the second channel is horizontally oriented. This corresponds to a horizontal, lateral installation of the device for determining and/or monitoring a process variable. For this case of a horizontal orientation of the second channel, the first hollow arranged below the first channel preferably has a lesser volume than the second hollow arranged above the second channel.

In an additional embodiment of the tube adapter, the at least one hollow has a sickle-shaped geometry. The surface of the first and/or second wall of the first and/or second channel in the field of the hollow is accordingly, at least partially, cylindrically embodied. The at least one hollow can, however, be embodied in the most varied of ways. Especially, it can also have a rotationally symmetric geometry.

In an embodiment of the tube adapter, at least in a margin of the at least one hollow, an extension region is provided, which especially adjoins the hollow tangentially. In the case, in which at least two hollows are provided in the tube adapter, the extension region can also be embodied in such a manner that it connects the two hollows with one another.

The object of the invention is achieved, furthermore, by an arrangement for determining and/or monitoring at least one process variable of a medium in a pipeline, comprising: a device for determining and/or monitoring the at least one process variable; and a tube adapter of the invention.

At least one component of the device is introducible or introduced into the second channel of the tube adapter. In an embodiment, the at least one component of the measuring device is a component of a sensor element. Especially, the component is a component, which in ongoing operation of the measuring device is, at least at times and/or partially, process-contacting, thus, contacts the medium, especially in the region of an end surface. Advantageously for such purpose, the tube adapter includes a securement unit, especially a screw thread, for securing the at least one component to or in the tube adapter. The securement unit is, in such case, preferably arranged in the first channel far end region of the second channel.

Since the device, or the component of the device, by the provision of the at least one hollow in the tube adapter terminates essentially flush with the wall of the first channel, the contact region between the device and the medium is advantageously limited to this area. The flush arrangement, thus, assures an essentially residue free cleaning of the arrangement, this being especially relevant for applications in sterile processes, in which a product is made from a raw or starting material by the application of chemical, physical or biological procedures.

The second and, in given cases, the third channel are/is advantageously sized in such a manner that the device, or the component of the device, which is introduced into the second channel, is accurately fit in such. In the case of a cylindrical embodiment of the device, or the component, thus, also the second channel has a cylindrical geometry, wherein the cross-sectional area is fitted to the dimensioning of the device, or the component of the device. In an embodiment, the second channel can also be at least a part of a housing of the component.

In an embodiment of the arrangement, a transition between the tube adapter and the device is essentially gap free and/or dead space free in the region of the first channel. The device or the component, thus, terminates in the introduced state in the second channel essentially flush with the wall of the first channel. Advantageously then, no deposits or fouling can build up between the device, or component, and the wall of the first channel.

The device or component can be equipped in the second channel, for example, with a sealing element. In such case, the sealing element is advantageously an O-ring.

Another embodiment provides that the device is a capacitive and/or conductive measuring device. The sensor element of the device includes then at least a first electrode and at least a second electrode electrically insulated from the first electrode. The second electrode is generally also referred to as the guard electrode. Of concern in this embodiment is, thus, a flush installed, capacitive and/or conductive sensor, which serves preferably for detecting a predeterminable fill level, or the conductivity of the medium. Such sensors, also referred to as multi-sensors, are described, for example, in DE102011004807A1, DE102013102055A1, and DE102013104781A1, to which comprehensive reference is taken. A corresponding sensor is furthermore produced and sold by the applicant under the designation, FTW33.

The at least one component of the measuring device is then preferably the electrode assembly having an, especially circularly shaped, end surface, wherein at least one electrode of the electrode assembly essentially terminates with the end surface. The end surface can be both planar as well as, also, at least partially, curved. In the state introduced into the tube adapter, the electrode assembly advantageously terminates essentially flush with the wall of the first channel.

However, other types of measuring devices can be used. A further example of a measuring device, is, for example, a device for determining and/or monitoring the pressure of a medium.

The object of the invention is achieved, furthermore, by a method for producing a tube adapter of the invention comprising method steps as follows:

providing a pipeline section having a tubular, first channel and a tubular, second channel, which is arranged at a first predeterminable angle to the first channel and connected with the first channel, and milling at least one hollow in a wall of the first and/or second channel in a transition region between a wall of the first channel and a wall of the second channel.

Advantageously, the at least one hollow can be milled into the transition region between the two channels after production of the pipeline section. Thus, on the one hand, existing tube adapters with two connected channels can be subsequently processed and, thus, be embodied for an application in sterile processes, in which a product is made from a raw or starting material by the application of chemical, physical or biological procedures. However, various advantages also result in the case of complete production according to the invention of a tube adapter of the invention. In a first manufacturing step, the two channels are formed in a pipeline section. For this, no special measures are required, so that, for example, a lathe or automatic screw machine can be applied for forming the channels. Such a production is rapidly and simple to implement and requires only a small effort. In a second working step, then the at least one hollow is formed. For this, a milling cutter can be advantageously introduced through an opening of the tube adapter into the same, in order to mill out the hollow. Thus, the adjusting of the geometry in the internal volume of the tube or tube adapter can be implemented for assuring, in simple manner, sterile conditions in an application in the field of sterile processes, in which a product is made from a raw or starting material by the application of chemical, physical or biological procedures. No complex, complicated, multistep manufacturing steps are required.

Advantageously for the milling, a spherical milling cutter and/or a circular segment milling cutter is used. With such milling cutters, a hollow can be introduced into the transition region in especially easy manner. Especially, a sickle-shaped hollow can be formed.

It is likewise advantageous that, for milling the at least one hollow, a tool, especially a milling cutter in the form of a cutting or chip removing tool, be introduced into an internal volume of the tube adapter through a first and/or second opening of the first channel, which serve for inserting the tube adapter into the pipeline, or through an opening of the second channel. Because of the introduction of the milling cutter through the opening of the second channel, for example, a monolithic rotation surface, and therewith a single rotationally symmetric hollow, or even a number hollows, especially of hollows separated from one another, can be made. In the case of introduction of the milling cutter through at least one opening of the first channel, it is, in turn, for example, on the one hand, possible that, during the total milling procedure of forming a hollow, the milling cutter is introduced through the same opening in the first channel. It is, however, likewise an option that the milling cutter be introduced at times through different openings, especially of the first channel, for producing a hollow.

A preferred embodiment of the method includes that for producing the hollow an imaginary guide curve is established, which has especially two, especially mirror equal, straight line sections, which are connected together by a curved section. In such case the surface of the hollow results in part from the geometry of the guide curve.

Another preferred embodiment includes that at least two hollows are milled.

The forms of embodiment set forth for the tube adapter of the invention are applicable, in each case, mutatis mutandis also for the arrangement of the invention and the method of the invention and vice versa.

DETAILED DESCRIPTION

The invention is usable with a wide variety of sensors 1. Without intending to limit the generality of the invention, the following description concerns, for purposes of simplification, the case of a flush installed, capacitive and/or conductive sensor 1, such as shown schematically in FIG. 1. Furthermore, the invention is usable for a large number of different embodiments, for example, geometries, for the tube adapter 7. Likewise, without intending to limit the general applicability of the invention, the following description concerns, for purposes of simplification, exclusively a T-shaped tube adapter 7. The considerations can be applied analogously for other measuring devices 1 and other embodiments of the tube adapter 7.

Figure 1:
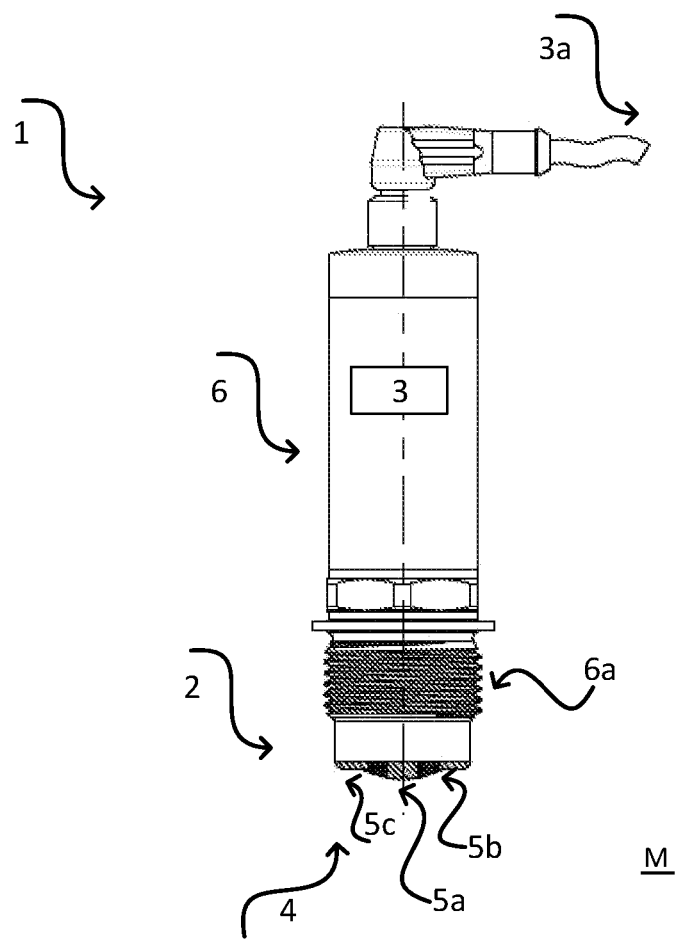
FIG. 1 shows a schematic view of a capacitive and/or conductive sensor for flush installation, according to the state of the art.

The measuring methods underpinning a capacitive and/or conductive measuring device, for example, a fill level measuring device, are known per se in the state of the art. Corresponding field devices are produced and sold by the applicant, for example, under the mark, LIQUIPOINT. A schematic view of a corresponding measuring device 1 is shown in FIG. 1. Sensor 1 includes a sensor unit 2, which, when the field device 1 is introduced into a pipeline, terminates essentially flush in the pipeline, as well as an electronics unit 3, which is connectable releasably via a connection cable 3a, for example, with an external unit (not shown).

Sensor unit 2 is essentially coaxially embodied and includes an electrode assembly 4, which in the illustrated example comprises a measuring electrode 5a, a guard electrode 5b and a ground electrode 5c. There can be, however, also electrode assemblies 4 with less than or more than electrodes 5a-5c. Following on the electrode assembly 4 is a housing 6, in which is arranged, among others, the electronics unit 3. Furthermore, the process connector 6a serves for releasable securing of the sensor 1 to a process connector or a tube adapter 7, such as shown in FIGS. 2 to 7.

Figure 2A:
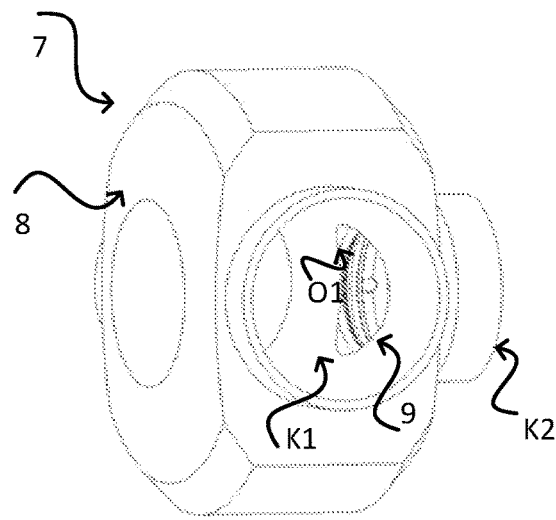
FIGS. 2a-2c show views of a tube adapter according to the state of the art.
Figure 2B:
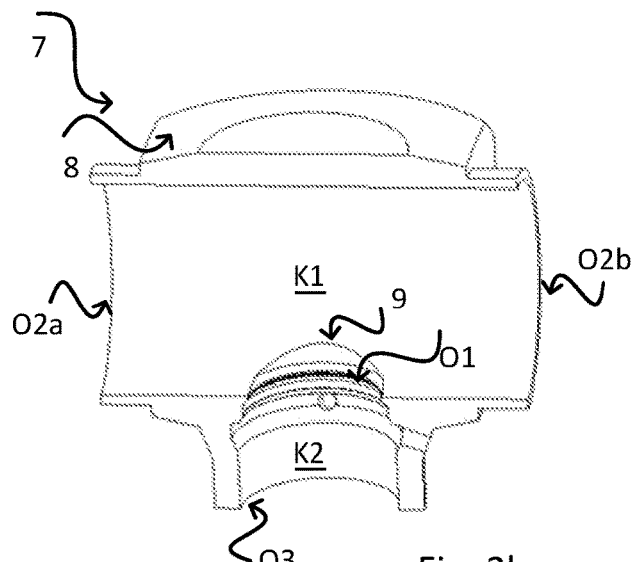
Figure 2C:
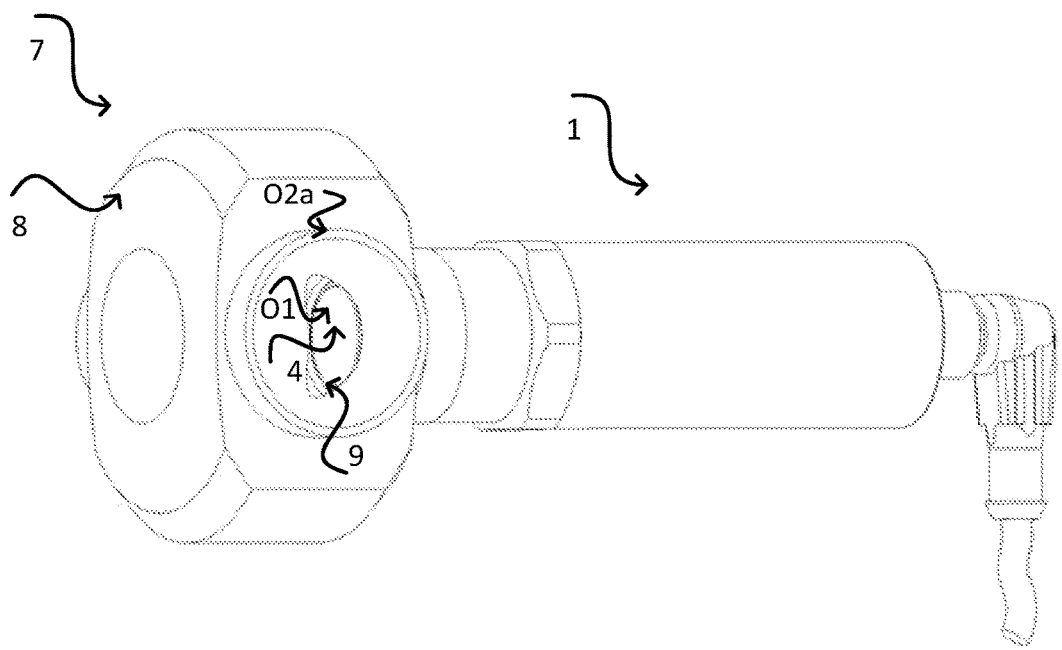

FIG. 2 shows a tube adapter 7 for a pipeline (not shown) with a pipeline section 8 according to the state of the art. The tube adapter 7 has a tubular, first channel K1 for inserting the pipeline section 8 into the pipeline and a tubular, second channel K2, which is arranged perpendicularly to the first channel K1 and which is connected with the first channel K1. FIG. 2a shows a perspective view and FIG. 2b a sectional view of the tube adapter 7. FIG. 2c shows the same tube adapter 7 with a measuring device 1 such as shown in FIG. 1 introduced into the second channel K2.

The two channels K1 and K2 have circular cross-sectional areas. A line of intersection between the first K1 and second channels K2 in the region of the opening O1 is correspondingly curved. If a sensor 1 such as shown in FIG. 1 is secured in the second channel K2, dead spaces can arise in the transition region between the surface of the electrode assembly 4 facing the medium M and the wall of the first channel K1. The electrode assembly 4 introduced into the opening O1 has namely, as a rule, a geometry other than that of the part of the wall of the first channel K1 surrounding the opening O1. As a result, deposits and/or media residues can easily form within the tube adapter 7, especially in the transition region 9 between the end surface of the electrode assembly 4 of the sensor 1 and the wall of the first channel K1. An application of an assembly of this type in the field of sterile processes, in which a product is made from a raw or starting material by the application of chemical, physical or biological procedures, is correspondingly not directly possible.

In order to avoid this problem, there is provided according to the invention in a transition region between the wall of the first K1 and the wall of the second channel K2 at least one hollow 10a, 10b in a wall of the first K1 and/or second channels K2, such as shown in FIG. 3-FIG. 7.

A tube adapter 7 with two hollows 10a and 10b is shown in FIG. 3. As in the case of FIG. 2, shown is a perspective (a), a section and a view with sensor 1 (c) introduced into the second channel K2. In contrast with the variant for a tube adapter 7 shown in FIG. 2, two hollows 10a and 10b are provided for the tube adapter 7 of FIG. 3 in the transition region 9 between the first K1 and second channels K2.

The volumes V1, V2 and/or geometries of the hollows 10a, 10b can be selected as a function of a diameter d1 of the first K1 and/or a diameter d2 of the second channel K2. Preferably especially an adjusting of the volumes V1 and V2 and/or geometries occurs for the case in which the two diameters d1 and d2 of the two channels are of different size, such as shown, by way of example, in the embodiment of FIGS. 3d and 3e. For the shown variant, a diameter d1 of the first channel K1 is less than a diameter d2 of the second channel K2. In order also for this case to be able to assure an essentially flush installed device (not shown) for determining and/or monitoring a process variable, one can proceed as follows: the ratio between the volumes V1 and V2 and a cross-sectional area of the first channel K1 is selected greater, the smaller the diameter d1 and/or the greater the ratio of the diameters d1 and d2 of the two channels K1, K2.

Figure 3A:
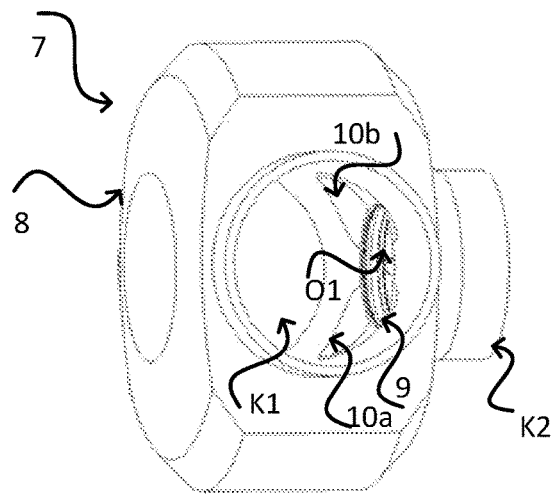
FIGS. 3a-3g show views of three possible embodiments of a tube adapter of the present disclosure with two hollows.
Figure 3B:
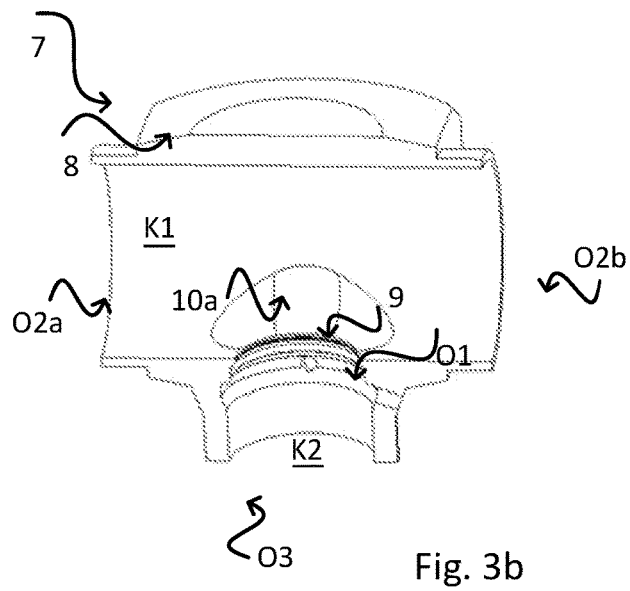
Figure 3C:
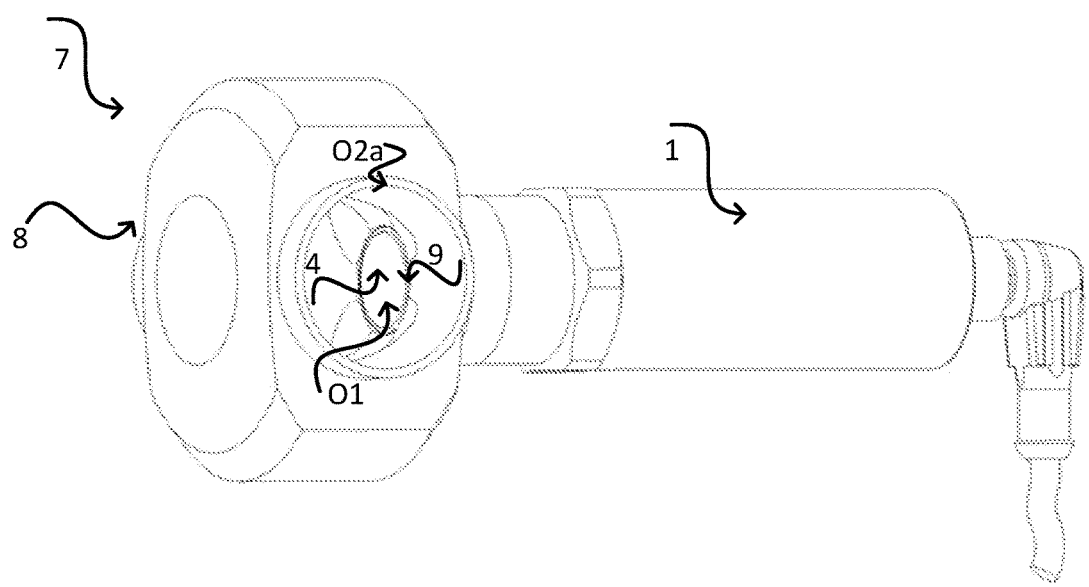
Figure 3D:
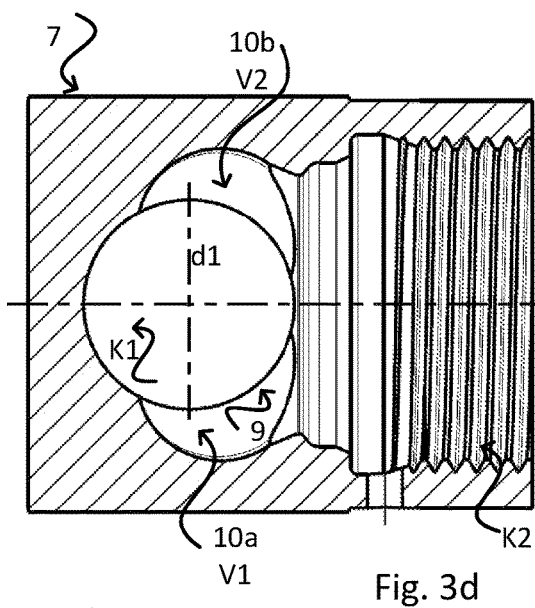
Figure 3E:
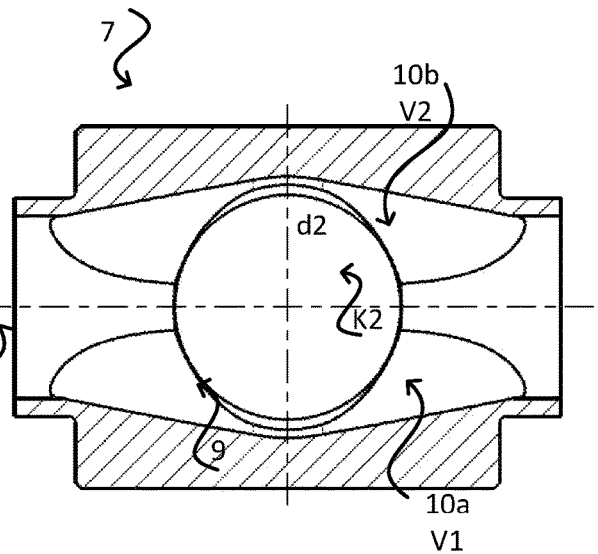
Figure 3F:
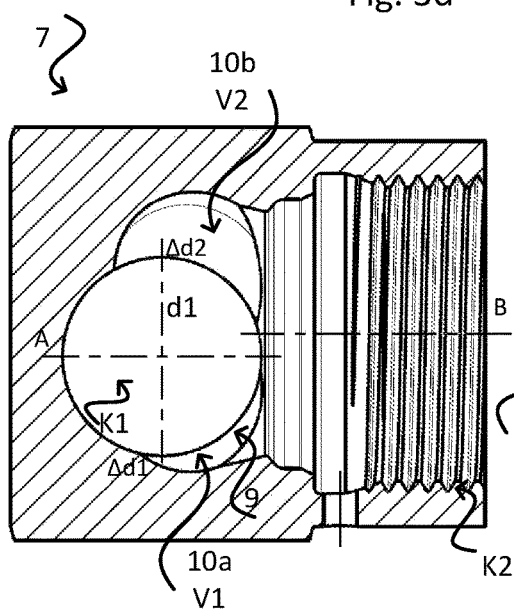
Figure 3G:
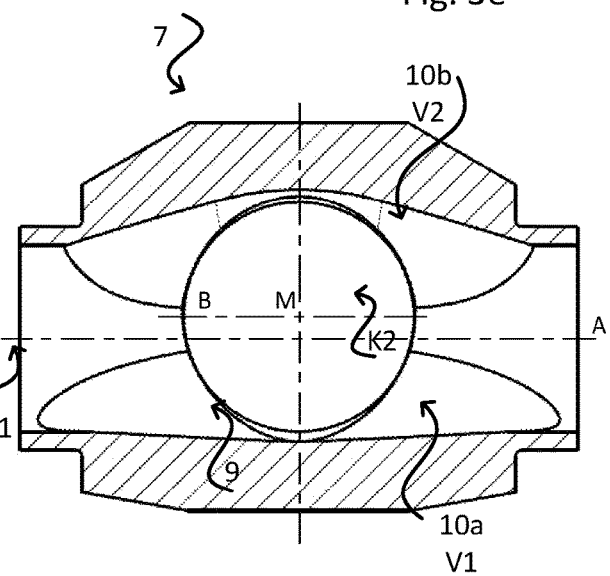

Another option is to choose the volumes V1 and V2 of the two hollows 10a and 10b such that they are of different size, such as shown in FIGS. 3f and 3g. The two shown views concern the case of a horizontal installation of the particular sensor. For this case, this manner of proceeding prevents the forming of a trap.

The volumes V1 and V2 are so selected that a first increase Δd1 of the diameter d1 of the first channel K1 due to the first hollow 10a and a second increase Δd2 of the diameter d1 of the first channel K1 due to the second hollow 10b are of different size, especially in the transition region 9. In this way there occurs in the transition region 9 between the first K1 and second channels K2 a parallel displacement of a horizontal axis B (which extends through the center M of the first diameter d1) relative to a central, horizontal axis A of the second channel K2. Horizontal means in this connection that the particular axis is parallel to a longitudinal axis of the second channel.

For the shown variant, the volume V1 of the first hollow 10a extending in the lower region of the second channel K2 is less than the volume V2 of the second hollow 10b extending above the second channel K2. In this way, a deepening of the lower wall of the second channel K2, thus, the wall in the region of the first hollow 10a, relative to the parts of the lower wall of the second channel K2 arranged outside of the transition region field 9 can be prevented and, as a result, the forming of a trap in the lower transition region 9 is prevented. Such a trap, or the presence of medium M in the trap, can lead namely to errors in the case of registering the particular process variable by means of a measuring device installed in the second channel K2. This can be prevented by the asymmetric embodiment of the two hollows 10a, 10b.

In all embodiments shown in FIG. 3, the hollows 10a and 10b assure that deposits cannot accumulate in the transition regions 9. This effect is illustrated further in FIG. 4.

Figure 4A:
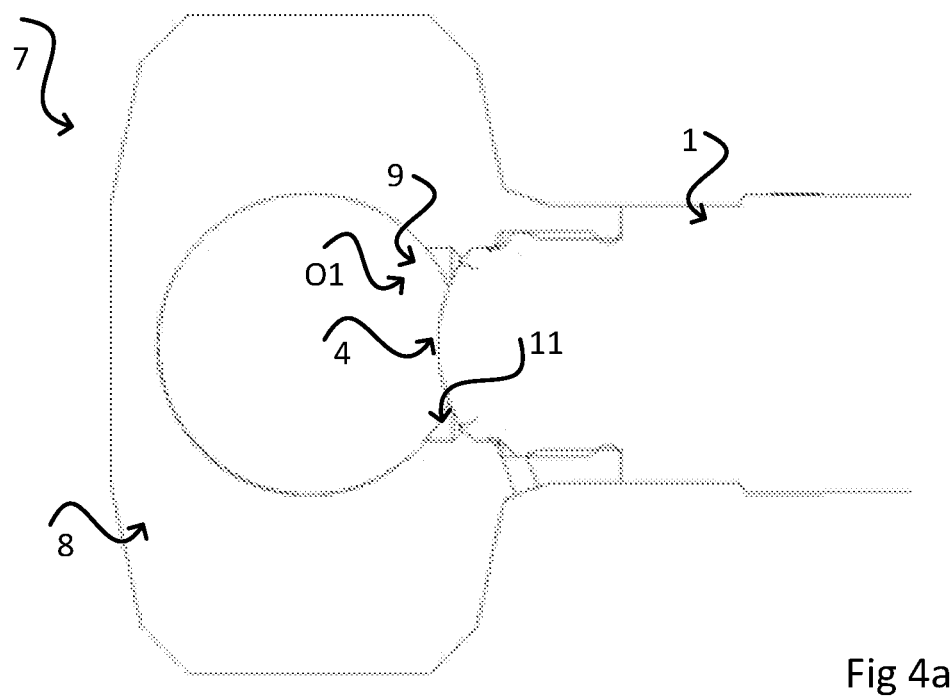
FIGS. 4a and 4b show two sectional views of a tube adapter without (a) and with (b) hollows for illustrating the effect of the hollows.
Figure 4B:
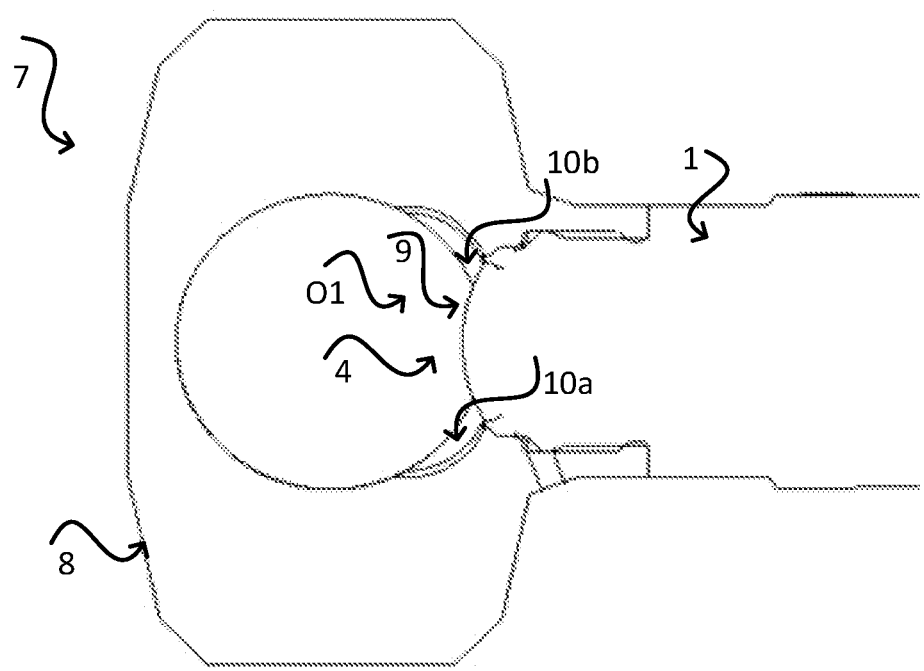

FIG. 4 shows another sectional view of a tube adapter 7 without (a) and with (b) the two hollows 10a and 10b, corresponding thus to the situations shown in FIG. 2 (a) and FIG. 3 (b). In the case of FIG. 4a, dead spaces 11 result in the transition region 9 due to the different geometries of the tube adapter 7 in the transition region and the sensor 1 in the region of the electrode assembly 4. In the case of FIG. 4b, in contrast, the two sickle-shaped hollows 10a and 10b provide an essentially gap and dead space free transition region 9.

It is to be noted here that the invention is, however, not limited to embodiments with two hollows 10a and 10b. Rather, numerous embodiments with different numbers of, however, at least one, hollows 10 are likewise within the scope of the invention. Furthermore, the invention is also not limited to the geometries of the hollows 10 shown in FIGS. 3 and 4. Other geometries can be used and fall within the scope of the invention.

Figure 5:
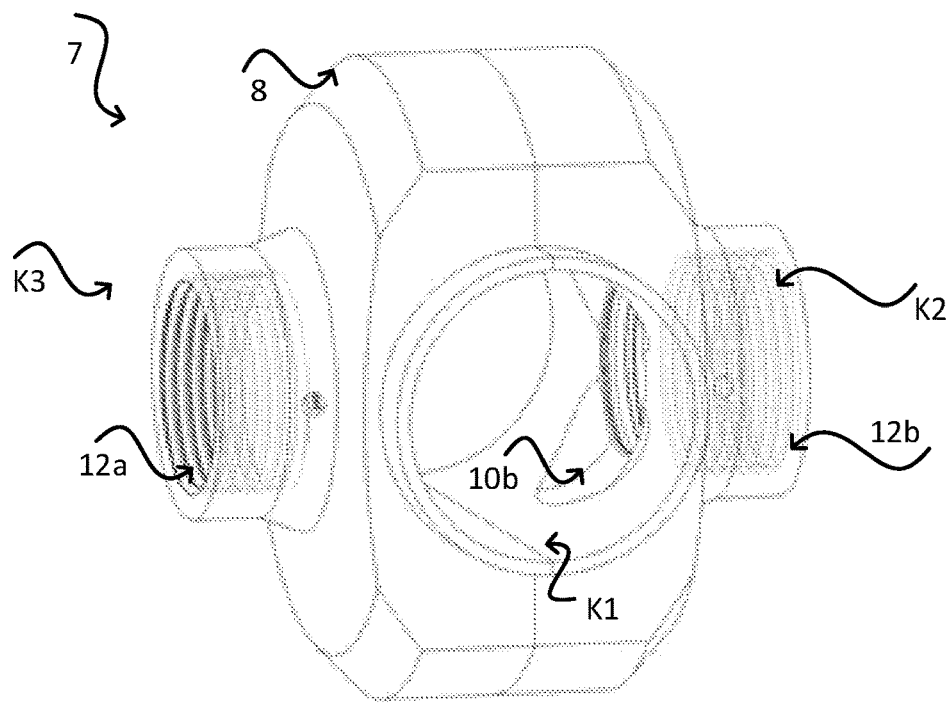
FIG. 5 shows an embodiment of the tube adapter of the present disclosure having second and third channels.

FIG. 5 shows another embodiment of a tube adapter of the invention 7, which has a second K2 and a third channel K3. The second K2 and third K3 channels are arranged mutually opposite one another and align with one another. The inner surfaces of the second K2 and third K3 channels, furthermore, bear internal threads 12a and 12b, which serve for securing sensors 1 in the channels K2 and K3. Furthermore, the embodiment of FIG. 5 corresponds to the embodiments shown in FIGS. 3 and 4 with two hollows 10a and 10b each for the second channel K2 and the third channel K3.

Figure 6:
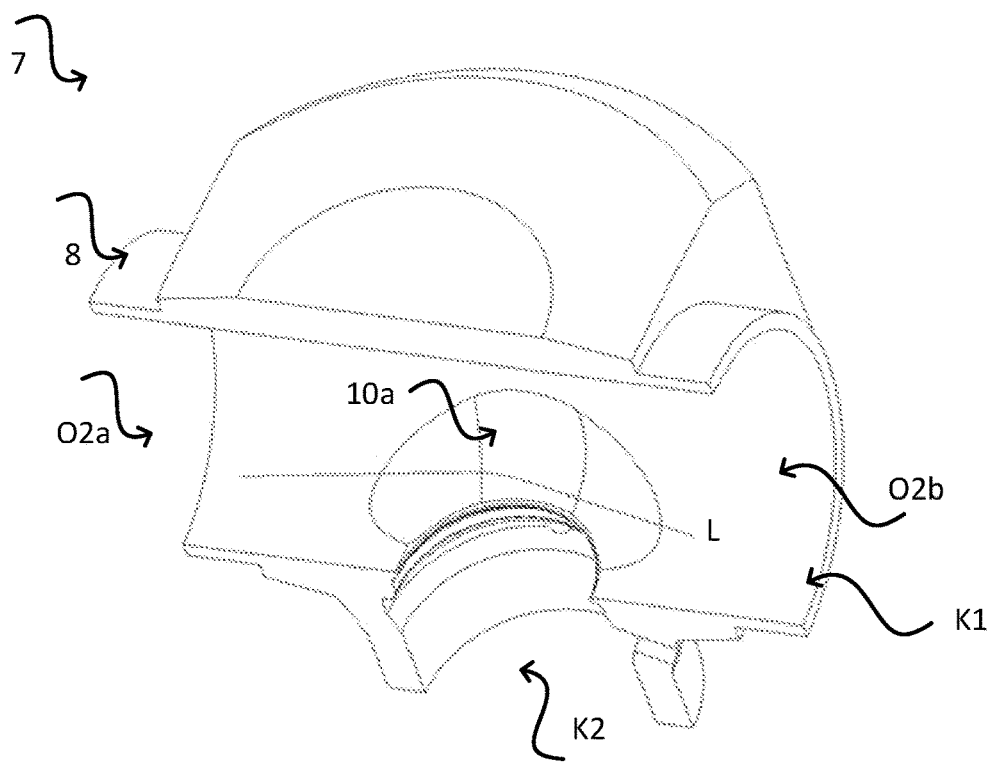
FIG. 6 shows a schematic, cross-sectional view of the production method by means of a milling procedure along an imaginary guide curve.

FIG. 6 shows the production of the two hollows 10a and 10b. The, tool, especially a cutting or chip removing tool, employed in each case, is introduced into the tube adapter 7 through one of the openings O2a, O2b. The tool is guided in such a manner that the surface of each of the two hollows 10a and 10b follows guide curves L. If a spherical milling cutter is used for the milling of the hollows 10a and 10b then, for example, a sickle-shaped geometry of the hollows 10a and 10b results in simple manner. However, also other geometries for the hollows 10a and 10b are possible and manufacturable, for example, likewise by establishing a guide curve L.

Figure 7:
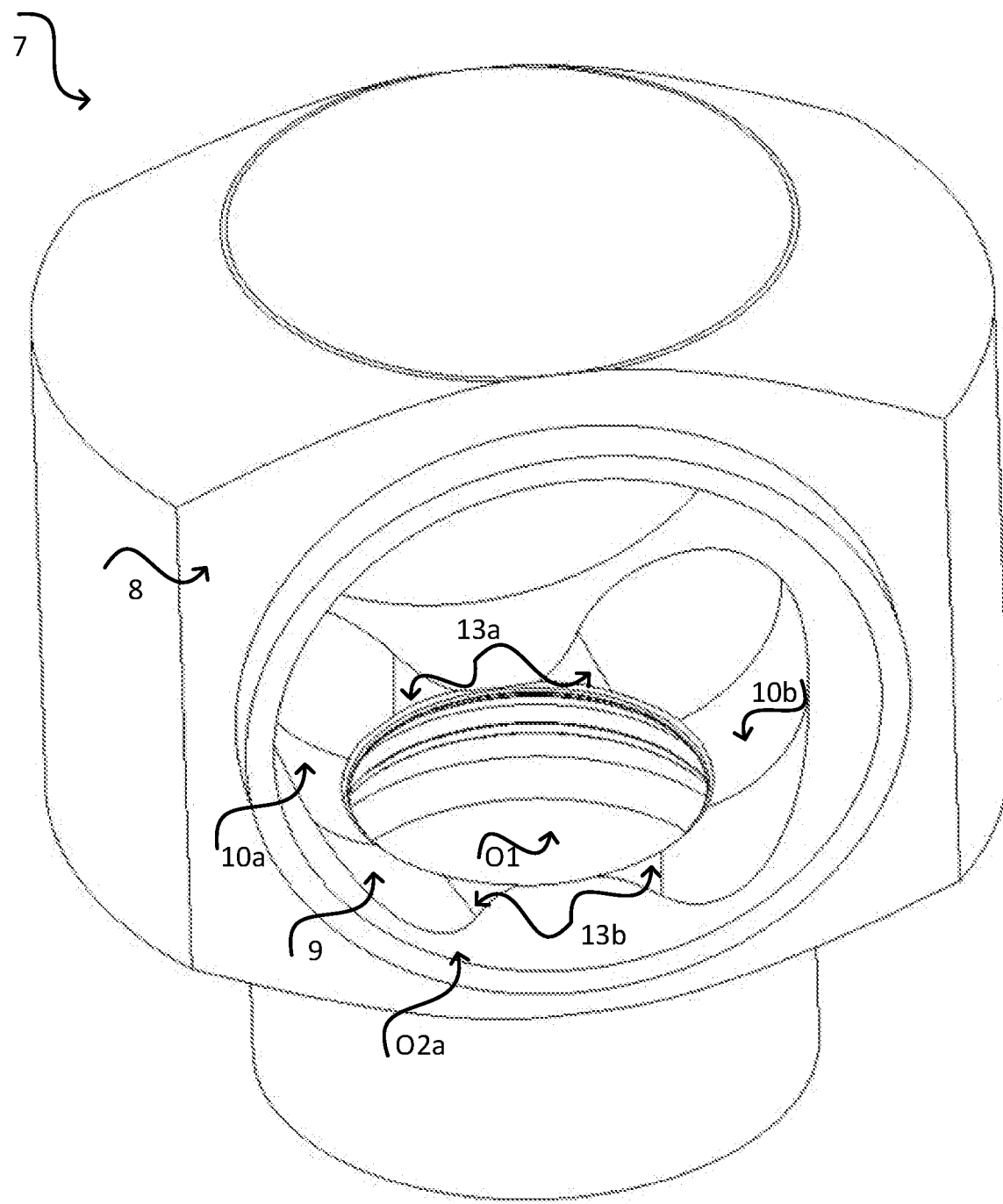
FIG. 7 shows an embodiment of the tube adapter of the present disclosure with two hollows and two connection regions.

FIG. 7 shows, finally, yet another embodiment of a tube adapter 7 of the invention with two hollows 10a and 10b, wherein two extension regions 13a and 13b adjoin the two hollows 10a and 10b arranged in the margins of the two hollows 10a and 10b. Because of this measure, the character of the transition region field 9 can be improved still further as regards fulfillment of hygiene requirements.

Finally, it is to be noted that the lengths of the channels K1-K3 can vary, depending on application. Thus, for some applications, it is desirable to minimize the length of at least some of the channels K1-K3. Also, the lengths of the channels K1-K3 can vary as a function of the manner, in which the tube adapter 7 is secured into the pipeline. For securing the tube adapter 7 into a pipeline in the region of the two openings O2a and O2b of the first channel, in such case, all securements, especially clamping connections, known to those skilled in the art can be used and fall within the scope of the invention.

The invention claimed is:

1. A tube adapter for a pipeline adapted for conveying a medium, the tube adapter comprising:
a pipeline section including a tubular, first channel configured to be introduced into the pipeline;
a tubular, second channel, which is arranged at a first predetermined angle relative to the first channel and connected with the first channel; and
at least one hollow defined in a wall of the first channel and/or a wall of the second channel in a transition region between the wall of the first channel and the wall of the second channel.

2. The tube adapter of claim 1, wherein a volume and/or a geometry of the at least one hollow is configured as a function of a diameter of the first channel and/or the second channel.

3. The tube adapter of claim 1, further comprising a tubular, third channel, which is arranged at a second predetermined angle relative to the first channel and is connected with the first channel.

4. The tube adapter of claim 1, wherein the at least one hollow includes at least two hollows into the transition region between the walls of the first channel and second channel.

5. The tube adapter of claim 4, wherein the at least two hollows are arranged opposite each other across a cross-sectional area of the second channel.

6. The tube adapter of claim 4, wherein a volume of a first hollow of the at least two hollows and a volume of a second hollow the at least two hollows are different, wherein in the transition region a first increase of a diameter of the first channel due to the first hollow and a second increase of a diameter of the first channel due to the second hollow are different.

7. The tube adapter of claim 1, wherein the at least one hollow has a sickle-shaped geometry.

8. The tube adapter of claim 1, wherein at least in a margin of the at least one hollow an extension region adjoins the at least one hollow tangentially.

9. An arrangement for determining and/or monitoring at least one process variable of a medium in a pipeline, the arrangement comprising:

a device configured to determine and/or monitor the at least one process variable; and a tube adapter according to claim 1.

10. The arrangement of claim 9, wherein a transition between the tube adapter and the device is essentially free of a gap and/or dead space near or at the first channel.

11. A method for producing a tube adapter, the method comprising:

providing a pipeline section having a tubular first channel and a tubular second channel, which is arranged at a first predetermined angle to the first channel and connected with the first channel; and milling at least one hollow in a wall of the first channel and/or second channel in a transition region between the wall of the first channel and the wall of the second channel.

12. The method of claim 11, wherein a spherical milling cutter and/or a circular segment milling cutter is used for the milling.

13. The method of claim 11, wherein, for milling the at least one hollow, a tool is introduced into an internal volume of the tube adapter through a first opening and/or a second opening of the first channel or through an opening of the second channel.

14. The method of claim 11, wherein, for manufacturing the at least one hollow, an imaginary guide curve is defined having two, symmetric, straight line sections, which are connected by a curved section.

15. The method of claim 11, wherein the at least one hollow includes at least two hollows, which are milled into the pipeline section.

\* \* \* \* \*